No. 731,029. PATENTED JUNE 16, 1903.
R. A. FESSENDEN.
METHOD OF UTILIZING THE ENERGY OF WAVES.
APPLICATION FILED MAY 4, 1903.
NO MODEL. 2 SHEETS—SHEET 1.

WITNESSES:
Herbert Bradley
Fred Kirchner

INVENTOR
Reginald A. Fessenden
by Darwin S. Wolcott Att'y

No. 731,029. PATENTED JUNE 16, 1903.
R. A. FESSENDEN.
METHOD OF UTILIZING THE ENERGY OF WAVES.
APPLICATION FILED MAY 4, 1903.
NO MODEL. 2 SHEETS—SHEET 2.
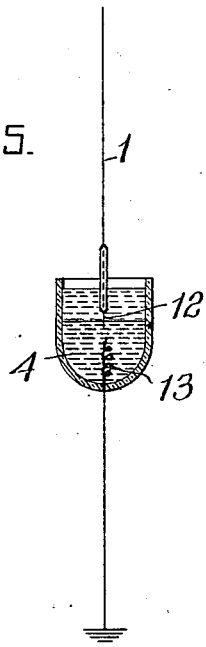
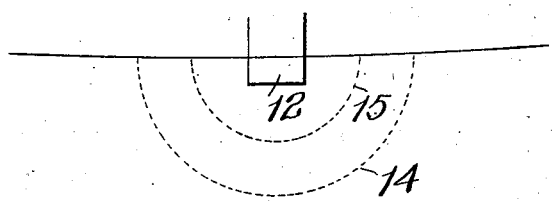
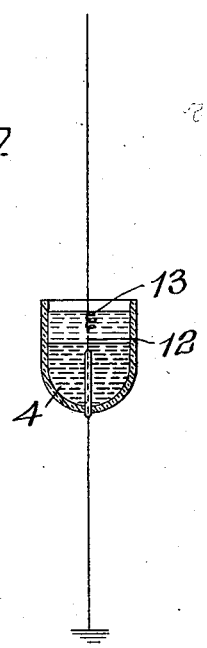
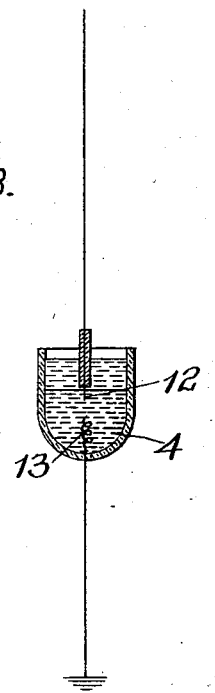

No. 731,029. Patented June 16, 1903.

UNITED STATES PATENT OFFICE.

REGINALD A. FESSENDEN, OF PITTSBURG, PENNSYLVANIA.

METHOD OF UTILIZING THE ENERGY OF WAVES.

SPECIFICATION forming part of Letters Patent No. 731,029, dated June 16, 1903.

Application filed May 4, 1903. Serial No. 155,567. (No model.)

*To all whom it may concern:*

Be it known that I, REGINALD A. FESSENDEN, a citizen of the United States, residing at Pittsburg, in the county of Allegheny and State of Pennsylvania, have invented or discovered certain new and useful Improvements in Methods of Utilizing the Energy of Waves, of which improvement the following is a specification.

The invention described herein relates to the method of utilizing the energy of waves or the energy derived from waves for signaling, &c.; and it consists, generally stated, in changing or modifying a condition or characteristic of a body of coherent material, as a liquid or solid, by the energy of waves or derived from waves and producing effects or indications by the effects produced in such body.

The invention is hereinafter more fully described and claimed.

Figure 1:
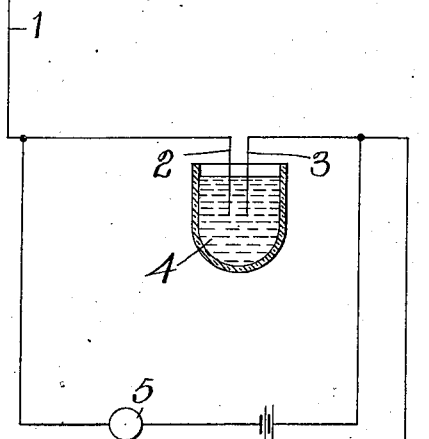

In the accompanying drawings, forming a part of this specification, Figure 1 is a sectional view of a form of receiver embodying my improvement. Figs. 2, 3, 4, and 5 are similar views of modified forms of receiver, and Fig. 6 is a diagrammatic view illustrating the mode of operation of the receiver. Figs. 7 and 8 illustrate further modifications in the construction of the receiver.

In the practice of my invention a receiver consisting of a small body or mass of coherent material is arranged in series with or in other operative relation to a conductor, said receiver by preference being in series with or in other operative relation to another circuit containing or controlling a translating device. The current generated in the conductor 1 by electromagnetic or other waves will so modify or change a characteristic or condition of the body of coherent matter as to produce an indication directly or cause it to so affect the second circuit controlled by said body as to cause or permit the operation of the translating device.

It is preferred to employ a liquid as a receiver, preferably an electrolyte, as giving the best commercial results for the following reasons: First, the liquids are not by reason of their nature injured by excessive discharges; second, because the specific resistance of liquids is much higher (in some cases as much as a million times greater) than that of metals, and consequently to obtain the same resistance a very much smaller mass which is capable of being heated to a much larger extent may be used; third, because the amount of change of resistance per degree of centigrade is very much greater—for example, the resistance of sulfuric acid when not quite concentrated changes approximately twelve per cent. per degree centigrade, while the change in platinum is only about one-third of one per cent. per degree centigrade. For all these reasons the results produced are very much greater and the action of the receiving device is much more reliable.

A liquid barretter, or current-actuated wave-responsive device, may be constructed in several ways. For instance, it is found that if the loop of a metal barretter such as described in Letters Patent No. 706,744, granted me August 12, 1902, be broken while it is immersed in a liquid, as nitric acid, it will nevertheless act even more efficiently than before, and hence a barretter may be formed consisting of two thin platinum wires 2 and 3, as shown in Fig. 1, having their ends immersed in a liquid contained in a suitable vessel 4 and forming, together with such liquid, a part of a receiving-circuit, including an indicating device 5. The immersion of the ends of the wires should be such that a perfect electrical contact will be formed between the wires and liquid. This barretter may be connected either directly or indirectly with a receiving vertical 1.

Figure 2:
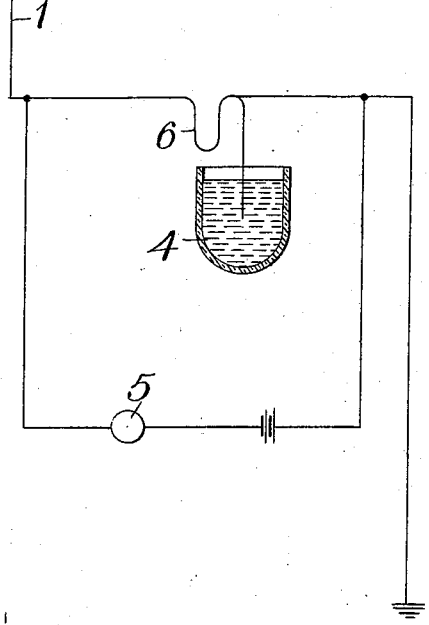

A second method is to moisten a minute fiber—for example, a cotton thread—and to use it as the loop of a barretter. A desirable construction for this form of barretter is shown in Fig. 2 and consists of a fiber loop 6, having one end immersed in a liquid, which will be caused to travel along the fiber by capillary action and maintain the fiber in a saturated condition.

A third method consists in forming a minute hole through a diaphragm 7, conveniently done by drawing down a very thin capillary tube to about three-thousandths (.003) of an inch internal diameter, cementing it into a hole in the center of a thick glass disk, and then grinding off the ends of the glass tube until they are flush with the surface of the diaphragm. The diaphragm is so arranged in a suitable vessel 4 as to form a partition between two portions of the solution in the cup or holder shown in Fig. 3, said portions being thus separated except by the thin column of the liquid contained in the capillary tube, said column forming the barretter. A terminal 9, preferably of platinum, connected to the vertical, is immersed in one portion of the liquid, and a second terminal, 10, preferably of platinum also, is connected to ground and has one end immersed in the other portion of the liquid. These platinum wires with the liquid are to be connected, either directly in series with the vertical or in the secondary of a transformer, and the barretter thus formed is adapted to be be used in the manner described in prior patents granted to me.

Figure 4:
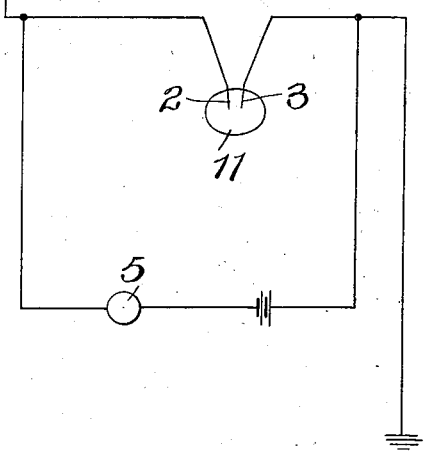

A fourth method is to connect two platinum wires by a thin film or small body of conducting liquid, as indicated in Fig. 4. This can be done conveniently by inserting the wires into a bubble 11, formed of such liquid.

A fifth method is to insert a small piece 12 of platinum or similar material into a liquid, such as nitric acid, so that it is only immersed a short distance. Fig. 5 shows such an arrangement, the platinum wire being covered with silver. The silver wire has a diameter of about .003 of an inch, and the platinum core inclosed therein has a diameter of about .00004 of an inch. The silver is removed or eaten off from the lower extremity, and the platinum core projects into the solution of nitric acid. This solution of nitric acid, which preferably contains nitrous acid, is covered by a layer of kerosene-oil, so as to prevent evaporation of the acid and to prevent the platinum from being fused. A second platinum wire 13 is also immersed in the liquid, preferably by inserting it through the bottom of the vessel 4, and these wires are connected to the vertical and to ground and also included in the indicating-circuit.

It follows from the well-known electrical formula giving the resistance of a cylindrical body in a conducting medium that practically all the resistance is concentrated within a short distance of the point where the platinum wire 12 projects into the acid.

For example, if platinum of a diameter of .00004 of an inch should be immersed in acid to a depth of .00002 of an inch practically all the temperature effects would be local or take place inside of a hemisphere whose radius would be .00004 of an inch. Such an imaginary hemisphere is indicated in Fig. 6, where 12 represents the tip of the platinum and 15 represents the hemisphere referred to. That this is true will be seen by considering a second hemispheric shell 14, having the thickness of .00004 of an inch outside of the hemisphere 15. The quantity of liquid in this shell 14 will be more than eight times that in the shell 15, and consequently it will take eight times the amount of heat to raise it to this same extent. At the same time the resistance of the shell 14 will be roughly the same as that of 15. Hence it follows that the effect of the shell 14 will be only one-eighth that of 15, and consequently that, although the effect of the different parts of the liquid within the boundary of 15 does not vary much and all parts are almost equally efficient, as soon as we pass the boundary of 15 the effect of the variations of liquid beyond the boundary begins to fall off very rapidly and at a distance of two or three times the diameter of the wire it may be neglected. This may be deduced at once from the proposition that the electrical resistance between two copper disks laid on a plate of sheet-copper is conditioned almost entirely by the size of the disk and by the conductivity of the copper sheet, while it is not affected except to an unappreciable extent by the distance between them. While for the purpose of illustration of the theory I have described and shown in Fig. 6 a depth of immersion equal to half the diameter of the terminal, the immersion should be such as to insure a perfect contact between the terminal and liquid—as, for example, with a platinum terminal .00004 of an inch in diameter it is preferably immersed a distance of .005 of an inch, or a distance equal to one hundred and twenty times its diameter.

As shown in Fig. 7, the terminal 12 may be inserted through the bottom of the vessel 4, in which case an insulating liquid, such as bisulfid of carbon, having a greater specific gravity than the liquid is used in connection with the latter.

As indicated in Fig. 8, the wire 12 may be so surrounded with glass as to prevent any gas given off from adhering to the wire, and thereby decreasing its effective area.

The arrangement of circuits used with the liquid barretter is practically the same as that with the metal barretter described in the patent referred to.

It is found that certain liquids act better than others—as, for example, though carbonate of soda, caustic soda, nitrate of potash, and other substances give good results, it is preferred to use nitric acid for the reason that the effects are stronger with it than with most other liquids, and in the case of a burn-out it is sufficient to screw down the platinum wire until it is again immersed. The burn-out is not liable to occur on account of the cooling effect of the liquid on the wire. When using silver-coated platinum wire, the screwing down of the wire into the nitric acid will subject the silver to the action of the acid, which will remove it from the platinum. If, however, a high voltage—e.g., seven or eight—be used in the local circuit, carbonate of soda will give larger effect than nitric acid.

It is to be noted that in the case of the liquid barretter the action of the electromagnetic waves is to cause a greater current to pass in the local circuit, owing to the fact that the conductivity of electrolytes increases instead of decreases with heat. With a liquid barretter having a resistance of between six hundred and two thousand ohms the increase of conductivity when the liquid is heated is so marked as to permit of the operation of a siphon recorder or relay, though a telephone may be used.

It is to be noted that there are several distinct methods in which metal and liquid can be used in conjunction. First, the case of a conductor, such as oxidized silver, in contact with a liquid like mercury, where the action is apparently a true coherer action caused by the voltage produced by the electromagnetic waves breaking down the insulating oxid and making a good electrical contact between the silver and mercury. This effect does not occur and is not utilized in my form of liquid barretter, for, in the first place, the resistance of my apparatus is constant and definite, does not alter by shock or jar, returns to the same value no matter what the strength of the wave, and an entirely new piece of wire immersed to the same depth when a burn-out has occurred allows the same current to pass as any other similar piece of wire. Again, the increase of conductivity is always the same in amount under the same conditions and is exactly what calculations show should be produced by the heating of the liquid. Secondly, the change of resistance is exactly proportional to the energy of the electromagnetic waves, thus differing from the operation of the coherer. Thirdly, if the size of the platinum wire be increased, the effect falls off very rapidly, as it should do according to theory, while in the case of coherer this is not true.

Figure 3:
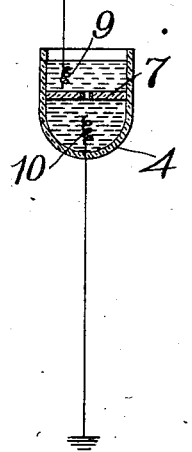

A second method of using liquid and metal is illustrated in Fig. 3 of Letters Patent No. 706,738, dated August 12, 1902, the apparatus therein being capable of rectifying the alternating currents produced by the electromagnetic waves. This effect does not occur when using my improved form of receiver, as may be readily shown by substituting such receiver for the electrolytic cell shown in the patent, in which case no such rectification will be found to occur. The evident reason for this is the fact that the resistance of the liquid barretter is so arranged as to absorb the energy and not to allow any of it to pass through. The energy by being absorbed, none of it can be rectified. A second reason is that the polarization capacity of the barretter is too small to permit of such rectification. A third proof of this consists in the fact that the signals are obtained almost as well when both terminals consist of similar pieces of platinum, in which case, according to theory, there should be no rectification. A third method consists in utilizing the depolarization of the electrode caused by the heating of the liquid. While there is no doubt that such an effect is probably produced, it is masked, and when in actual working practically the entire effect seems to be due to the change in resistance. An effect which appears when the voltage of the local circuit is raised to such a point as to cause the gases to bubble off too freely from the point gives rise to a fourth method. When this is the case, the waves effect an increase in resistance instead of diminution, possibly by first causing the bubble of gas to be deposited, which decreases the area of contact between the liquid and the platinum wire. This action is, however, irregular and occurs only at a certain critical point, and as it does not always occur and regularly it is not available for actuating an indicating mechanism.

While the liquid-receiver will work well no matter which pole is connected to the platinum, it is found in practice that better results are obtained when the platinum point is made negative, probably because bubbles of gas which may come off are dissolved in the liquid and tend to maintain the conductivity.

I claim herein as my invention—

1. As an improvement in the art of signaling by waves the method herein described which consists in changing or modifying a condition or characteristic of a body of coherent matter by energy derived from said waves.

2. As an improvement in the art of signaling by waves the method herein described which consists in changing or modifying a condition or characteristic of a body of coherent matter by current derived from said waves.

3. As an improvement in the art of signaling by waves the method herein described which consists in changing or modifying a condition or characteristic of a non-gaseous conducting body by current derived from said waves.

4. As an improvement in the art of signaling by waves the method herein described which consists in changing a condition or characteristic of a body of liquid by current derived from said waves.

5. As an improvement in the art of signaling by waves the method herein described which consists in changing or modifying a condition or characteristic of a body of coherent matter by a current derived from said waves, and localizing in the body the effect produced by the current.

6. As an improvement in the art of signaling by waves the method herein described which consists in changing or modifying a condition or characteristic of a body of liquid by a current derived from said waves and localizing in the body the effect produced by the current.

7. As an improvement in the art of signaling by waves the method herein described which consists in changing or modifying a condition or characteristic of a body of coherent matter by a current derived from said waves, and producing an effect or indication by the effect produced in said body by the current.

8. As an improvement in the art of signaling by waves the method herein described which consists in changing or modifying a condition or characteristic of a body of liquid by a current derived from said waves, and varying the current in a circuit by the effect produced in the body of liquid by said current.

9. As an improvement in the art of signaling by waves the method herein described which consists in transforming the energy of said waves into another form of energy in a body of coherent matter.

10. As an improvement in the art of signaling by waves the method herein described which consists in transforming the energy of currents derived from said waves into another form of energy in a body of liquid.

11. As an improvement in the art of signaling by waves the method herein described which consists in transforming the energy of currents derived from said waves into heat in a body of liquid.

12. As an improvement in the art of signaling by waves the method herein described which consists in transforming the energy of currents derived from said waves into another form of energy and localizing said energy in a body of liquid.

13. As an improvement in the art of signaling by waves the method herein described which consists in transforming the energy of currents derived from said waves into another form of energy in a body of liquid and producing an effect or indication by the transformed energy.

14. As an improvement in the art of signaling by waves the method herein described which consists in increasing the conductivity of a mass of coherent material by currents derived from said waves.

15. As an improvement in the art of signaling by waves the method herein described which consists in changing the resistance of a body of liquid by currents produced by electromagnetic waves, and localizing such resistance in said liquid.

16. As an improvement in the art of signaling by waves the method herein described which consists in transforming the energy of currents derived from electromagnetic waves to energy of a different form in a body of liquid, localizing such transformed energy in said body and causing such transformed energy to act cumulatively.

17. As an improvement in the art of signaling by waves the method herein described which consists in transforming the energy of currents derived from electromagnetic waves into molecular energy.

In testimony whereof I have hereunto set my hand.

REGINALD A. FESSENDEN.

Witnesses:
WILLIAM F. BISSING,
MARY A. CONSTANT.